R. H. EDMISTON.
GRADOMETER.
APPLICATION FILED MAR. 30, 1910.

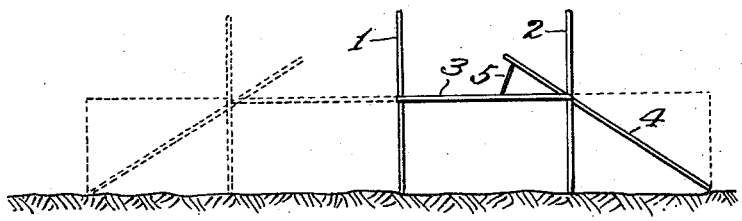
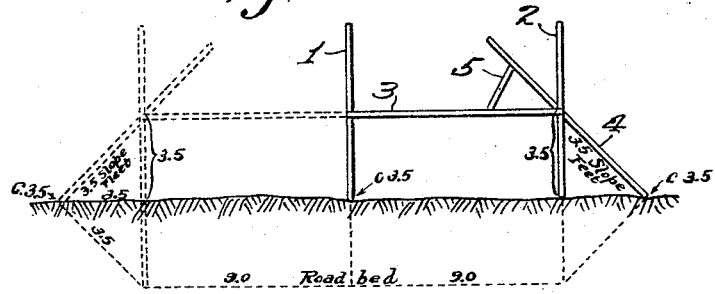
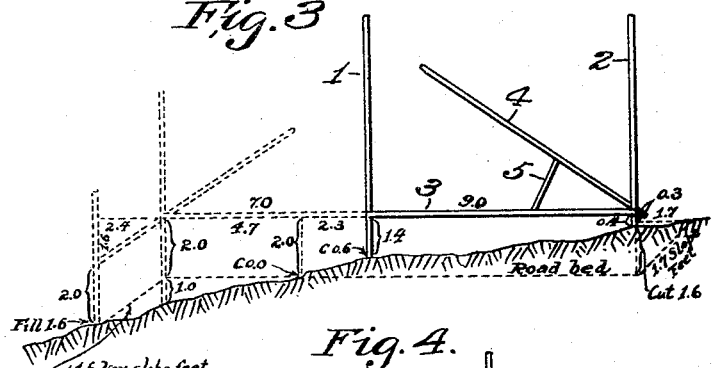
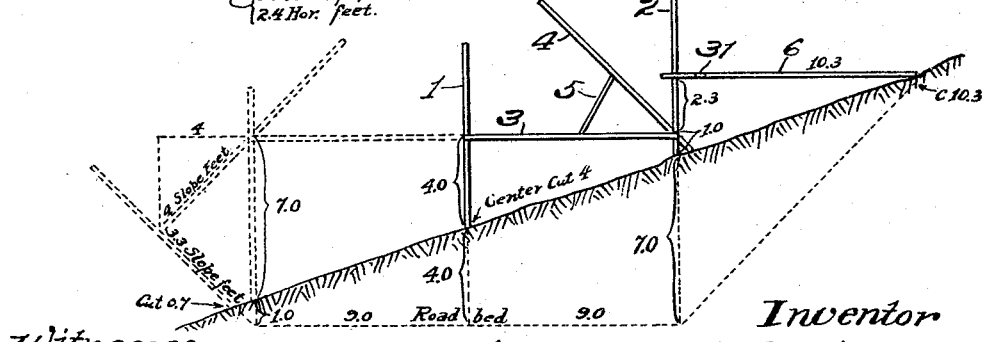

1,199,355.

Patented Sept. 26, 1916.
2 SHEETS—SHEET 2.

Witnesses
G. H. Hiles.
C. C. Holly.

Inventor
Robert H. Edmiston
by James R. Townsend
his atty.

UNITED STATES PATENT OFFICE.

ROBERT H. EDMISTON, OF LONG BEACH, CALIFORNIA.

GRADOMETER.

1,199,355.  Specification of Letters Patent.  Patented Sept. 26, 1916.

Application filed March 30, 1910. Serial No. 552,434.

*To all whom it may concern:*

Be it known that I, ROBERT H. EDMISTON, a citizen of the United States, residing at Long Beach, in the county of Los Angeles and State of California, have invented a new and useful Gradometer, of which the following is a specification.

This invention relates to means for locating the points for slope stakes and for measuring the cubic contents of railway and other earth work.

The object of this invention is to greatly simplify the operation and to greatly reduce the labor and length of time required for determining the data relating to earth work, and to minimize the liability of error in the calculations of such earth work.

Heretofore in constructing road beds, the work of locating the slope stakes, taking the measurements and computing the earth work has been very tedious and laborious. After the center line of the road-bed is located and stakes set at one hundred feet apart and the levels of the ground at the stakes are taken and the engineer has established the grade, the places at which the slope stakes must be set are determined by measuring at right angles from the center line to the sides of the grade; such measurements being made at each of the center stakes, also at each point where a definite change of surface occurs, to the points, respectively, where the cut or fill, as the case may be will terminate and there the slope stakes are set in the earth.

Heretofore there has been no method of instantly determining the distance out from the center line at which the slope stakes should be set, and the points at which said slope stakes must be set have only been determinable by experiment.

An object of this invention is to enable the engineer or his assistant to locate such points mechanically and without experiment.

Another object is to enable the engineer or his assistant to at once determine without calculation the height of fill, or depth of cut, distance out from center line and amount of earth work for one foot in length at any cross section.

An object of the invention is to provide an instrument by which the cubic contents of each linear foot of an excavation or fill may be determined instantly in cubic yards when the measurement is made, thus enabling the engineer to practically make his computations of the earth work in the field and avoiding the necessity of night work or extra day-work in making computations.

I have discovered that by constructing a gradometer comprising rods inscribed for making vertical and transverse measurements of a cut or fill, and a graduated slope rod having thereon inscriptions to indicate cubical contents per lineal unit of the cut or fill; said rods being connected together in pivotal and slidable relation with each other that it is made possible to accomplish this object; and I regard the invention as pioneer in that, heretofore no instrument of like character or capable of accomplishing the same work has been provided or suggested, and the invention is regarded as including the novel gradometer slope rod provided with graduations for lineal measurement and inscriptions in connection with such graduations respectively, to indicate cubical contents of a portion of a cut or fill measured with relation to the graduations.

With this instrument the only computations necessary for a day's work after the day's measurements are taken is to simply compute the sum totals of the stations by simple arithmetical processes which any person with a common school education can perform, accuracy alone being required.

Another object is to provide an instrument by which the side measurements may be readily taken on ground covered with brush without the necessity of cutting any brush at the sides of the center line, thus greatly saving time as well as labor.

In the accompanying detail description the term "slope foot" is used to indicate the quotients resulting from dividing the hypotenuse of a vertical triangle by its base or perpendicular. The term "horizontal slope foot" is used to indicate the result from dividing such hypotenuse by the base; and the term "vertical slope foot" is used to indicate the result from dividing the hypotenuse by the perpendicular. For example:—In a slope of 1 to 1, the base and perpendicular are of the same length; and therefore the vertical slope foot and horizontal slope foot are in that case the same; while in a slope of 1½ to 1, the base being 1½ times the perpendicular, the horizontal slope foot is just two-thirds the length of the vertical slope foot. For the purpose of illustration consider a four-foot fill of 1½ to 1, the lower edge of the slope is six feet out from the edge of the road-bed; and the triangular cross-section outside the road bed fill has a base of 6 lineal feet, a perpendicular of 4 lineal feet and a hypotenuse of 7.2111 lineal feet which being divided by the base 6 gives 1.2018 horizontal slope feet. The same slope distance 7.2111 lineal feet divided by the vertical 4 gives 1.8028 vertical slope feet.

In the case of a triangular cross-section of the cut outside the road bed, in a six foot cut with slope of 1 to 1, the distance out from the edge of the road-bed is the same as the altitude of the bank and the slope distance on the face of the bank is 8.4852 and this divided by either the base or perpendicular gives 1.4142 slope feet for such cut. The length of a slope foot therefore is always greater than that of a lineal foot and may infinitely vary in length.

The accompanying drawings illustrate the invention.

Figure 1 shows the gradometer in use in taking measurements for a fill on a level surface. Fig. 2 is a view analogous to Fig. 1 in which the measurement is being taken for a cut in level surface. Fig. 3 shows the gradometer in use in taking measurements for a side hill cut at the right and a side hill fill at the left on a surface showing a grade point on the cross section at one side of the center line. The slope-rod as shown in solid lines is not in commission. Fig. 4 is a view of the gradometer in use for taking measurements for a side hill cut where a side hill rod is required. In the foregoing views the gradometer is shown in elevation in position for taking measurements on the right side of the center line of the road bed and the positions of the parts for taking the measurements on the left side of the center line of the road bed are shown in dotted lines. The slope-rods are set at a slope of 1½ to 1 for the fills and at a slope of 1 to 1 for the cuts. In various places the abreviation C. or c. is used to indicate the word cut, and Arabic numerals are used with decimal points to indicate the feet or tenths of feet in which the dimensions of the cut or fill are indicated, thus in Fig. 3, c 0.0 indicates grade or a cut of no feet and no tenths of a foot, and c 0.6 indicates a cut of six tenths of a foot. Fig. 5 is a fragmental detail in front elevation of the gradometer as shown in Fig. 1. The face of the road bed 14 feet wide, the sides of which have a slope rod which is exposed to view is graduated and inscribed for a slope of one and one-half to one. Fig. 6 is a plan section on line $x^6$—$x^6$, Fig. 5. Fig. 7 is a fragmentary plan of the horizontal rod and its extension clamps. The brace is omitted. Fig. 8 is a sectional detail on irregular line $x^8$—$x^8$, Fig. 5, looking to the left. Fig. 9 is an elevation partly in section, from line $x^9$—$x^9$, Fig. 5. Fig. 10 is a fragmentary view of a face of the slope-rod, showing graduations and inscriptions for a one to one slope on a road bed 14 feet wide. Fig. 11 is a view of a face of the slope-rod showing graduations and inscriptions for a one-half to one slope on a road bed 14 feet wide.

The gradometer comprises center and side vertical graduated rods 1 and 2, a horizontal graduated rod 3, adjustably mounted on said vertical rods, a graduated slope rod 4 adjustably connected with the side vertical rod 2, an extensible brace 5 adjustably connecting the slope rod with the horizontal rod and constituting means to hold the slope rod in true position, and an auxiliary or side hill rod 6 that is disconnected from the elements above enumerated and is only used for special measurements as hereinafter more particularly set forth. The rods and brace are in pivotal and slidable relation with each other.

The slope rod is connected with the vertical side rod by a hinge pivot 7, the axis of which pivot is normal to the side rod and is level with the top surface or indicator edge 8 of a clamp slide 9 by which the horizontal rod 3 is connected to the side rod 2, set screws 10 and 11 being provided whereby the clamp slide may be adjustably fixed to the vertical side rod 2 and the horizontal rod 3. The adjustable brace 5 is hinged at 12 to a clamp slide 13 that slides on the horizontal rod 3 and is adjustably fixed thereto by the set screw 14 so that the angle of the slope rod may be changed. The upper end of the brace 5 is hinged by the pivot 15 to a sleeve 16 in which the slope rod 4 slides freely. Said sleeve is hinged by the hinge pivot 7 to the clamp slide 9 and may be of any suitable construction. An opening 17 is provided adjacent the indicator edge 8 of the clamp slide 9 through which graduations and inscriptions indicated in the columns $a$, $b$, $c$ on the slope rod may be read at the axis of the pivot.

The graduations and inscriptions in column $a$ give the depth of cut or height of fill; those of column $b$ give the distance out from the center line of the road bed, to the point marked by the lower end of the slope rod; and those of column $c$ give the volume of a determined cross section of lineal unit of measurement, namely, one foot, along the surveyed line and on one side of said center line. In Fig. 5 the slope rod 4, which is graduated for a road bed 14 feet wide and is set for a slope of 1½ to 1, indicates that if it is stationed on the road bed with the vertical rod 1 on the center line of the road bed and the vertical rod 2 on the top side line of the road bed, and consequently 7 feet from the center line of the road bed, the fill at that point is 4 feet deep and the edge of the bottom of the fill is 13 feet from the center of the road bed. It also indicates that the cubical contents of one lineal foot of that half of the road bed for which the measurement is made is 1.48148 cu. yds.

The vertical rods, horizontal rod and slope rod are all graduated in accordance with the requirements of the work to be measured. Both vertical rods are provided with graduations $d$, $e$,—for example, marking feet and tenths of feet. The horizontal rod may be correspondingly graduated so that the distance between the vertical rods may be determined, although where a set distance is required between the vertical rods, the horizontal rod may be devoid of graduations.

The slope rod may be provided on its opposite faces with various scales in which the graduations $a$, $b$, $c$, are calculated for the various slopes to which the apparatus may be applied for measurement, and the auxiliary or side hill rod will be graduated on one side with graduations $d$ $e$ corresponding to the graduation on the vertical rods, and on another side with graduations corresponding to graduations $a$ in Fig. 10, giving the depth of cut and the height of fill for a bank of 1 to 1. The graduations $a$ do not mark lineal feet relative to the slope-rod 4, but mark the vertical distance between the horizontal planes of the road bed surface and the ground surface at the toe of the slope; i. e. at the point where the slope rod touches the ground at the bottom of the slope. The graduations $b$ indicate lineal feet relative to the bottom of a right-angle triangle of which the slope rod forms the hypotenuse and the rod 1 forms the vertical side; so that when the rod 1 is set on the center line of the road bed and the rod 2 is set on the top edge of the road bed and the slope-rod rests on the ground, the graduation $b$ at the rod 2 indicates the horizontal distance between the rod 1 and a vertical line drawn from the lower end of the slope rod 4. For convenience of description, I term the graduations $a$ slope feet.

In a 1 to 1 slope (see Fig. 10) the graduations $b$ are of the same length as the graduations $a$. In a $\frac{1}{2}$ to 1 slope the graduations $b$ are twice those of $a$, and in a $1\frac{1}{2}$ to 1 slope the graduations of $a$ are one and a half the length of the graduations $b$.

The slide clamps 9 and 18 that connect the horizontal rod with the vertical rods are each provided with orifices 19 and 20, the orifices 19 being for the vertical rods and the orifices 20 for the horizontal rod. The set-screws 11 and 22 are provided to fix the horizontal rod in the orifices 20, and the set-screws 10 and 21 are provided to engage the vertical rods to hold the horizontal rod at the required heights thereon.

The horizontal rod may be made extensible as shown in Figs. 5, 6 and 7, being halved together and provided with the clamp sleeves 23, 23', having set-screws 24. A like extensible construction is provided for the extensible brace 5 having the sleeves 25 with set-screws 26.

The horizontal rod in the form shown is composed of two bars 27 and 28 and in the upper side of each, near the ends thereof, are bubble-tubes 29, 30, so that the attendants stationed at the vertical rods respectively, can each readily determine when the horizontal rod is in a true horizontal position. The side-hill rod 6 is also provided with a bubble-tube 31 near one end so that the attendant may level the same. The slope rod slides freely through the pivotal sleeve 16 so that the attendant in charge thereof can slip it up and down as required to bring the lower end onto the ground. The brace 5 holds the sleeve rigid at the appropriate angle for the slope rod according to which face thereof is to be read.

Before beginning operations, the attendants will set the gradometer by adjusting the slope rod to an angle with the horizontal rod 3, corresponding to that of the proposed bank slope with the horizon. That is to say, for a slope of one to one, the slope rod forms the hypotenuse of a right angle triangle the base and perpendicular of which will be equal, while for a slope of one and one-half to one, the base of the triangle will be one and one-half times the perpendicular, and for a slope of one-half to one, the base will be equal to one-half the perpendicular. When the gradometer has been set, the attendants will bring it into upright position with the center perpendicular rod at the center line of the survey. The attendant having charge of the center vertical rod 1 will bring said rod to position over the center line at the point from which the measurement is to be taken and the attendant in charge of the side vertical rod 2 will carry such rod to a point at the side where the horizontal rod is practically normal to the center line of the proposed road-bed.

In practice there are employed four persons, viz: an attendant for each of the vertical rods, an engineer or other person having the grade book which gives the elevations for the grade at the center line; and in which book he will record the readings or measurements at each station and sub-station and an attendant to drive the slope stakes. The engineer or other man in charge will call the amount of the cut or fill at the center line of the cross section at which the slope stake is to be set, and the vertical rod attendants will set the horizontal rod at that height on the vertical center rod corresponding to the cut or fill called, and will set the vertical rod on the surface at the center line. The side vertical rod attendant will adjust the side vertical rod and the horizontal rod to the position necessary to hold the horizontal rod level when the side rod rests on the surface at the side edge of the proposed road-bed. This position can be readily determined by the eye, the attendant bringing the horizontal rod into position at right angles to the center line of the surface. Then the side attendant will slip the slope rod down the sleeve until the lower end of the slope rod is at the appropriate place which may be different in different instances as illustrated by Figs. 1 and 2, or in some instances the use of the slope rod may be dispensed with on the upper side hill cut as shown in Figs. 3 and 4.

Where, for example, as in either Fig. 1 or 2 the surface is level and a fill or cut is to be made, the slope rod will be brought to the surface of the ground so that a triangular area is inclosed between the ground surface and the slope rod and side rod. Then, as will be seen from the diagrams there will be inclosed above the ground between the surface thereof and the slope rod, horizontal rod and center perpendicular rod, an area equal to the area to be filled or excavated. If, however, a measurement is being taken on a side hill cross section as in Fig. 4, the horizontal rod when set according to the elevation announced, will not bring the slope rod into position to reach the surface of the ground at the top of the bank and therefore, the auxiliary rod 6 must be used.

In cases where the ground slopes so as to require a fill for a distance that cannot be measured by the slope rod a tape line, not shown, may be attached to the end of the slope rod by any suitable attaching means, not shown, and carried down the hill in a right line from the slope rod until the surface is reached on that slope.

The distance out column *b* in all instances begins with a numeral indicating one-half of the width of the road-bed to be measured by that scale so that when the vertical rod 2 is placed at the center of the road-bed and the slope rod 4 extends at right angles to the center line of the road-bed and its lower end is brought to a level with the lower end of the vertical rod, the distance between the lower ends of the two rods will be one-half of the road-bed. In Fig. 5 the column *b* begins with 7 instead of with 9 as in Figs. 10 and 11, thus indicating that the scale there shown is calculated for a 14 foot road-bed. The ratio between the graduations of column *a* and *b* is one to two-thirds, so that two graduations of column *a* equals three graduations of column *b*. Since the scale begins with zero for column *a* and with 7 for column *b*, graduation 4.0 in column *a* coincides with graduation 13.0 in column *b* as shown in Fig. 5.

In the different problems diagrammatically illustrated in Sheet one of the drawings the measurements are indicated in units and decimals, and it may be observed as follows:—Fig. 2 represents a cross section in cut on level ground. Road-bed, 18 feet, slopes 1 to 1. The gradometer is placed with the vertical rod 1 at the center stake, and vertical rod 2 nine feet to the right. The horizontal rod, 3, is clamped at 3.5 on vertical rod 1, and as the surface is level, it is also clamped at the same height on vertical rod 2. This places the horizontal rod, which must be level, 7.0 above the road-bed. The slope rod 4 is adjusted to a slope of 1 to 1, which places it normal to the slope of bank.

By reference to Fig. 10, where the graduations are made for the slope 1 to 1 on a road bed 18 feet wide, it will be seen that in the cut or fill column the marks representing units of measurement begin at zero, and in the distance out column, the marks representing units of measurement begin at 9, so that the distance out marking represents nine digits above the cut or fill marking. Thus the graduation 10 in the distance out column is marked 1 in the cut or fill column; the graduation marked 11 in the distance out column is marked 2 in the cut or fill column, and so on. This difference of 9 between the initial graduations of *a* and *b*, in Figs. 10 and 11, represents half the width of an 18 foot road bed; while in Fig. 5 the difference of 7 between the initial graduations of *a* and *b* represents half the width of a 14 foot road bed.

Now referring again to Fig. 2, if we run the slope rod out 3.5 slope feet as indicated in the cut or fill column, now shown in that view, and which will indicate actual 3.5 vertical feet and 3.5 horizontal feet by lineal measurement, the slope rod will touch the surface at the point for the slope stake. The length of the slope rod from the vertical rod 2 to the lower end of the slope rod corresponds to the distance from the top to the bottom of the bank on the slope thereof and is 3.5 slope feet, which corresponds in this instance to 3.5 vertical feet and 3.5 horizontal feet as measured from the bottom of the vertical rod 2 to the surface of the road bed or 3.5 horizontal feet measured outward from the bottom of the vertical rod 2 to the toe of the bank.

In the scale for an 18 foot road bed, the reading in the distance out column exceeds by 9 the reading in the cut or fill column, so that when the reading 3.5 is given by characters in the cut or fill column showing the depth of the cut or fill, the reading in the distance out column will be 3.5 plus 9, that is to say, 12.5 and the reading of cubic yards is 1.39352, indicating that many cubic yards of cut or fill for one foot in length of the road bed half way across the road bed.

From the nature of the views these readings are not shown in the drawings. The slope foot in a slope of 1 to 1=1.414 vertical or horizontal feet. The vertical and horizontal slope foot in a slope of 1 to 1 are the same.

It is customary in railroad grading for single track that the surface of the road-bed in the cut shall be 18 feet wide and the surface of the road-bed on the fill shall be 14 feet wide. Therefore the distance horizontally from center line of the road-bed to the edge of the road-bed in the cut is nine feet, and on the fill is seven feet.

Fig. 3 shows a cut on the right; but it shows a fill on the left, and consequently at some point on the cross section there is a grade point. In this case, if we set the horizontal rod 3 on vertical rod 1 at C. 0.6 the center cut called for, we find the surface at vertical rod 2 too high to level the horizontal rod, so we set it any distance above so it will be on a level and above the surface on vertical rod 2. In this case we set the rod 1.4 above the center cut C. 0.6, which places the horizontal rod 2.0 above the road-bed, and when level and clamped at vertical rod 2 it is 0.4 above the surface, showing a cut at that point of 1.6. But the surface is rising to the right and we find the point for slope stake as described in connection with the use shown in Fig. 4.

On the left the surface is lower, and we find it below grade. Set slope rod 4 to 1½ to 1, thus setting the gradometer for measuring the slope of the fill. Change the horizontal rod 3 from 9.0, half the width of the road-bed surface in a cut, to 7.0, half the width of the surface of the road-bed on a fill, and level it, and we have it set on vertical rod 1 at 1.4=2.0 above grade, and a vertical rod 2 it is set at 3.00 showing a fill of 1.00. Now run the slope rod 4 out until it reaches a point that is 2.00 above the surface of ground and we have the point for a slope stake. The distance read in slope feet from the lower end of slope rod 4 to the surface must be the same distance read in lineal feet that the horizontal rod 3 is above grade. The fill and distance out are read on the slope rod as in Fig. 3 except that the calibrations $c$ of the slope rod as shown in Fig. 5 will be used, the same being calibrations for a slope of 1.5 to 1. Now the horizontal rod being 2.0 above the road-bed we have only to find a point where the surface is just 2.0 below the horizontal rod which is the grade point at 2.3 to the left of center stake. The cut to the left of the center stake is a triangle, and the fill consists of two triangles, so the end area may be found in cubic yards for one foot in length from a correction table not shown, giving the cubic contents for one foot in length of the triangular parts of cubical cross sections.

Fig. 4: Right side shows a side-hill cut, road-bed 18 feet, slope, 1 to 1 and center cut 4.00. We place the gradometer in position and set the horizontal rod 3 at 4.00 on the vertical rod 1, at center stake. This places the horizontal rod at 8.00 above the road-bed, and when level and clamped on the vertical rod 2, we find it 1.00 above the surface of the ground, showing the surface at that point to be 3.00 higher than the center, and a cut of 7.00 at that point. Now we want a point for the slope stake, not shown, that will be the same distance from the vertical rod 2, that it would be vertically above the elevation of the road-bed. To find this point, we use a light side-hill rod 6 with a bubble tube 31 near the inner end, and graduated in feet and tenths of feet; leveling it at 1.00 on vertical rod 2, which is 8.00 above the road-bed, we find the horizontal distance to be short; but, placing it farther out and at the same time higher on vertical rod 2, we find a point at 3.3 on the vertical rod 2 which=10.3 above the road-bed, where the side-hill rod 6 reads 10.3 feet, which gives the point for the slope stake and a cut 10.3 distance out, being 19.3 feet, the distance out from the center of the road-bed.

By looking on the slope rod at cut 10.3, or in the earthwork table, not shown, for 18-foot road-bed, slope 1 to 1, we find for the half cross section cut 10.3=5.39796 cubic yards; then in the correction table, not shown, for 19.3×6.3, (10.3 center cut 4.0= 6.3) we find 2.25167 cubic yards to be subtracted 5.39796—2.25167, equals 3.14629 cubic yards for one foot in length, on the right of center line. That is to say, the cubic measure 5.39796 cu. yds. represents the cubic contents of a body extending one foot along the road bed and bounded by triangle whose base is the horizontal distance from the road center to the slope stake, said distance being 13.3 feet, the perpendicular being 10.3 feet, and the hypotenuse a distance from the center of the road bed to the slope stake; thus leaving out of account the excavation of the obtuse triangle whose base or shortest side is the half width of the road bed, the next longest side, the length of the slope from the edge of the road bed to the slope stake, and the longest side, the line from the slope stake to the center of the road bed. The correction of 2.25167 cu. yds. to be deducted represents the portion of the cross section measured by the instrument which is not to be excavated, so that when the deduction is made, the remainder 3.14629 is the true amount of the required excavation.

On the left the surface is lower than the center. The gradometer being set with its horizontal rod 3 four feet above the ground at the center of the road bed, and the horizontal rod being level and clamped on vertical rod 2, we run the slope rod out four slope feet, (the horizontal and vertical slope feet being the same length in a slope of 1 to 1), at which point it meets and is normal to the prolonged line of slope of bank. With the side-hill rod, which is also graduated in slope-feet, we measure from the lower end of and normal to the slope rod to the ground, this being the slope of bank prolonged. The end of the slope rod being 4.00 above and 4.00 to the left side of the edge of the road-bed, we take the distance from the end of the slope rod to the surface, which is 3.30 slope feet,=3.30 vertical or horizontal slope feet, and subtract from 4.00, which gives the cut 4.00—3.30=cut 0.70.

I claim:—

1. A gradometer comprising two vertical rods, a horizontal rod fastened to said vertical rods between the same, and a slope rod in pivotal relation with and adjustable relative to the vertical and horizontal rods and provided with graduations and inscriptions to indicate the cubical contents of a lineal cross section unit of a cut or fill, said inscriptions showing the cubical contents of the cut or fill indicated at various positions of the slope rod.

2. The combination with a vertical rod, of a horizontal rod adjustably mounted on the vertical rod, a slope rod adjustably connected by sliding horizontal pivotal means with the vertical rod, means to hold the slope rod in true position, said slope rod being provided with graduations and inscriptions readable with relation to the vertical rod and the horizontal rod to indicate the cubical contents of a lineal cross sectional unit of the cut or fill to be measured.

3. The combination with vertical rods, of a horizontal rod connecting the same and a graduated slope rod slidingly connected with one of said vertical rods, said vertical and horizontal rods being graduated for lineal measurement, and said slope rod being graduated and inscribed to indicate cubical contents of a cross-sectional lineal unit of a cut or fill.

4. A gradometer comprising a vertical rod, horizontal rod adjustably connected thereto, a sleeve pivotally connected with the horizontal rod, means to hold the sleeve against pivotal movement and a slope rod slidable in the sleeve and graduated and inscribed substantially as and for the purpose set forth; said slope rod being slidably and pivotally connected with said means.

5. In combination, graduated rods at right angles to each other slidably connected together and inscribed for making vertical and transverse measurements, and a graduated slope rod slidably connected to said vertical rod and pivotally connected relative to said vertical and transverse measurement-rods at the junction thereof, said slope rod being inscribed at its graduations with numerals that are products of said measurements and of a unit of lineal measurement.

6. A gradometer comprising two vertical rods, a horizontal rod slidable vertically along said vertical rods, means to hold the rods in slidable relation, a slope rod in slidable relation with and pivoted to the horizontal rod, and an extensible brace pivotally connecting the slope rod with the horizontal rod.

7. The combination with a vertical rod of a horizontal rod adjustable thereon, a sloping slide sleeve, slidable on the vertical rod with the horizontal rod and a slope rod slidable in the sleeve for measuring the slopes of the proposed cut or fill.

8. In a gradometer, the combination of two vertical rods, a horizontal rod connecting the same, a slope sleeve connected to one of said vertical rods and a slope rod adjustable in the slope sleeve.

9. In a gradometer, the combination of two vertical rods, a horizontal rod connecting the same a slope sleeve connected to one of said vertical rods and a slope rod adjustable in the slope sleeve; said slope sleeve being adjustable to change the angle of the slope rod relative to the other rods, and means to hold the slope sleeve in true position.

10. A gradometer comprising two vertical rods, a horizontal rod, means to adjustably clamp the horizontal rod on the vertical rods, a sleeve in pivotal relation to the horizontal rod, an adjustable brace to hold the sleeve in true position and a slope rod slidable in said sleeve.

In testimony whereof, I have hereunto set my hand at Los Angeles, California, this 24th day of March, 1910.

ROBERT H. EDMISTON.

In presence of—
 JAMES R. TOWNSEND,
 L. BELLE RICE.

Copies of this patent may be obtained for five cents each, by addressing the "Commissioner of Patents, Washington, D. C."

It is hereby certified that in Letters Patent No. 1,199,355, granted September 26, 1916, upon the application of Robert H. Edmiston, of Long Beach, California, for an improvement in "Gradometers," errors appear in the printed specification requiring correction as follows: Page 2, lines 56-57, strike out the words and numeral "road bed 14 feet wide, the sides of which have a"; same page, line 59 as now numbered, after the article "a" insert the words and numeral *road bed 14 feet wide, the sides of which have a;* and that the said Letters Patent should be read with these corrections therein that the same may conform to the record of the case in the Patent Office.

Signed and sealed this 21st day of November, A. D., 1916.

[SEAL.]

F. W. H. CLAY,
*Acting Commissioner of Patents.*

Cl. 33—88.